Jan. 3, 1950     E. ZIPPER     2,493,055
INTERNALLY EXPANDING BRAKE
Original Filed May 20, 1940     5 Sheets-Sheet 1
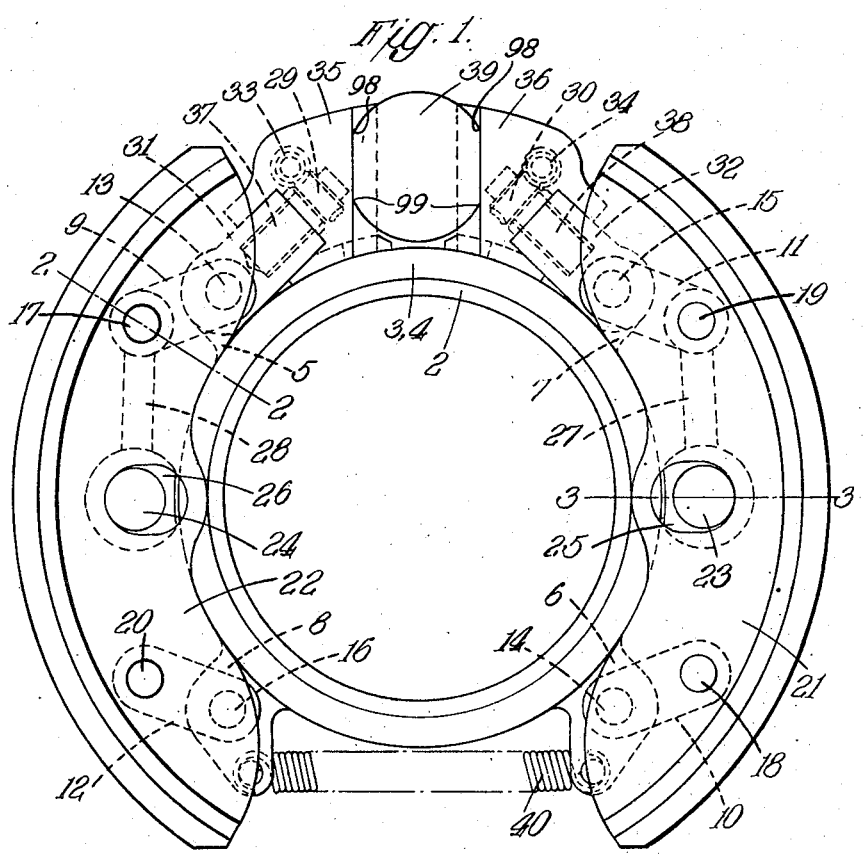
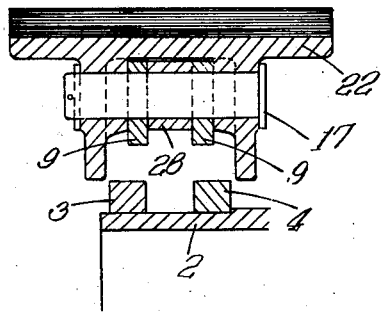
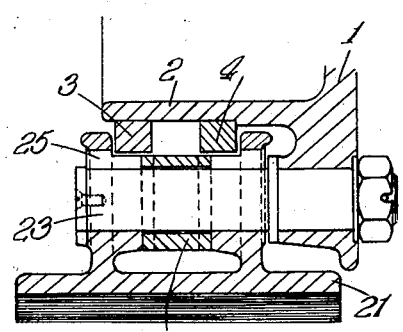
INVENTOR:
EMIL ZIPPER

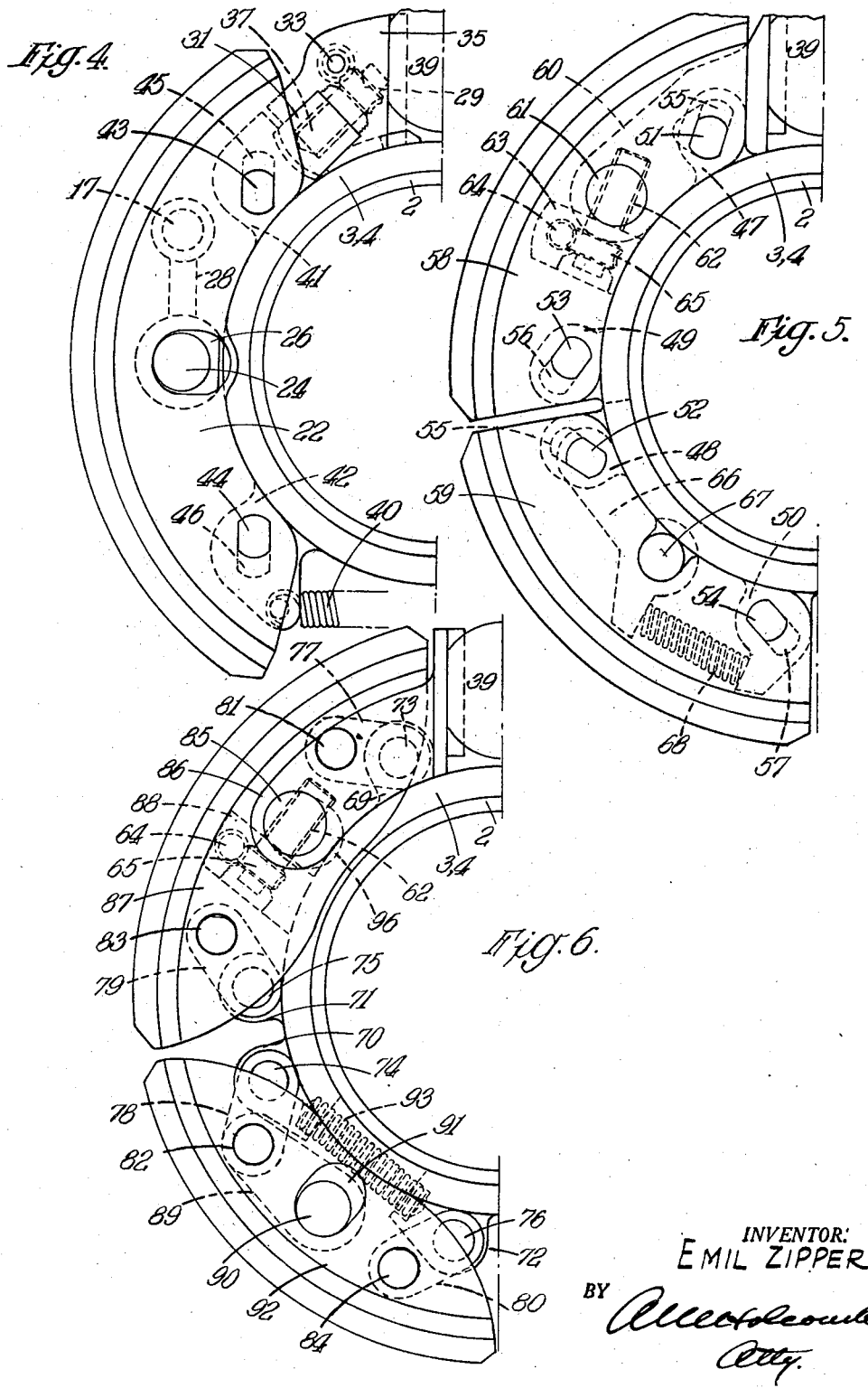

Jan. 3, 1950      E. ZIPPER      2,493,055
INTERNALLY EXPANDING BRAKE

Original Filed May 20, 1940      5 Sheets-Sheet 3

INVENTOR:
EMIL ZIPPER

Jan. 3, 1950 E. ZIPPER 2,493,055
INTERNALLY EXPANDING BRAKE
Original Filed May 20, 1940 5 Sheets-Sheet 4

INVENTOR:
EMIL ZIPPER
BY Allenscombe
Atty.

Jan. 3, 1950 E. ZIPPER 2,493,055
INTERNALLY EXPANDING BRAKE
Original Filed May 20, 1940 5 Sheets-Sheet 5
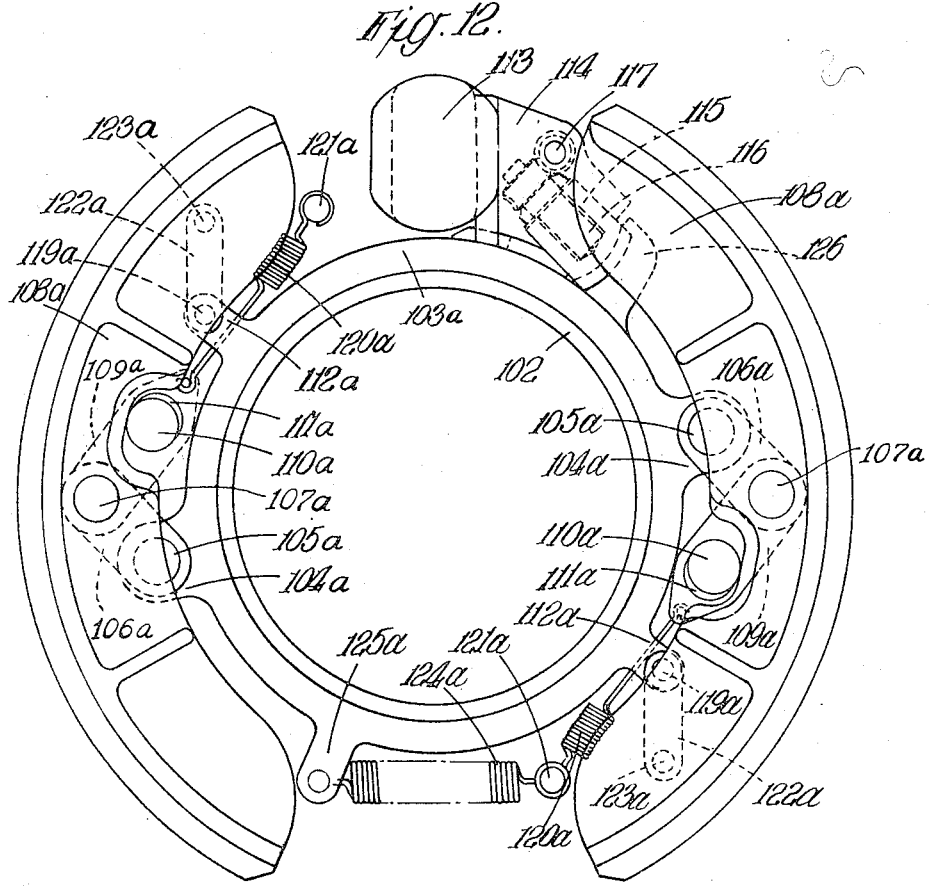
INVENTOR:
EMIL ZIPPER Patented Jan. 3, 1950

2,493,055

UNITED STATES PATENT OFFICE 2,493,055

INTERNALLY EXPANDING BRAKE

Emil Zipper, Santa Monica, Calif.; vested in the Attorney General of the United States Original application May 20, 1940, Serial No. 336,290. Divided and this application May 29, 1945, Serial No. 597,341. In Great Britain May 23, 1939

6 Claims. (Cl. 188—78)

This invention relates to brakes and more particularly although not essentially to brakes suitable for road vehicles such as omnibuses and to aeroplanes. The present application is a division of my copending application Serial No. 336,290, filed May 20, 1940, now Patent No. 2,376,889, which issued May 29, 1945.

The main objects of the invention are to provide means of simple constructional form for operating brake shoes which will provide efficient servo action and parallel brake motion.

In order that the invention may be more clearly understood, it will now be briefly described with reference to the accompanying drawings, in which:

Figure 1 is a side elevational view of a brake made in accordance with the invention.

Figure 2 is a sectional view on the line 2—2 in Figure 1.

Figure 3 is a section on the line 3—3 in Figure 1.

Figures 4, 5, 6 and 7 are side elevations showing modified constructions of brakes made in accordance with the invention.

Figure 7:
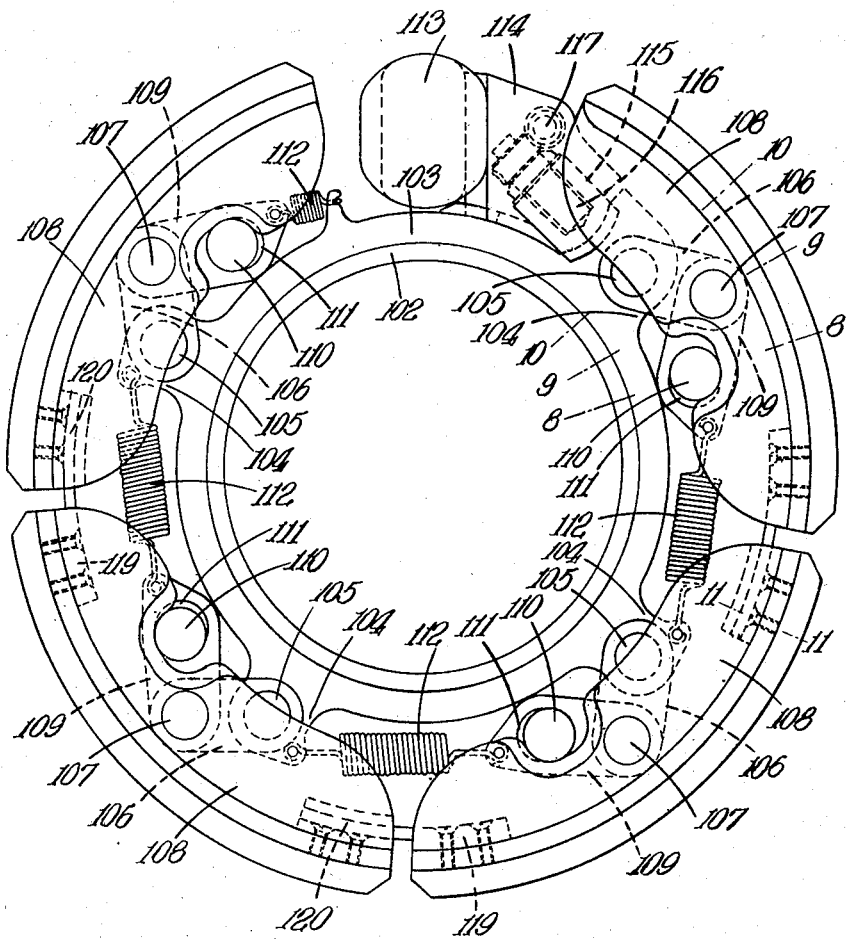
Figure 8:
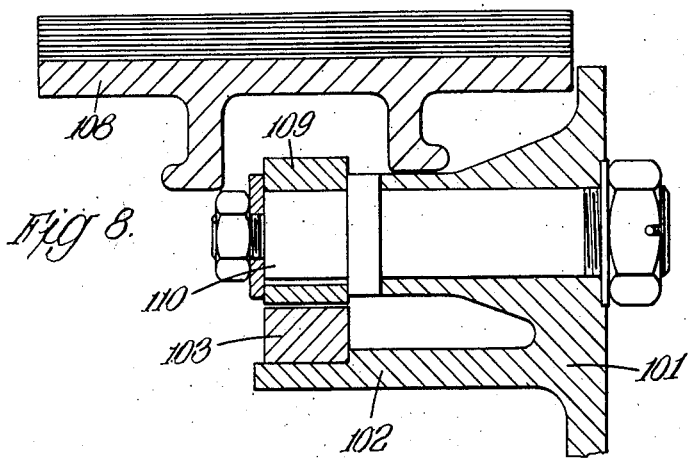
Figure 9:
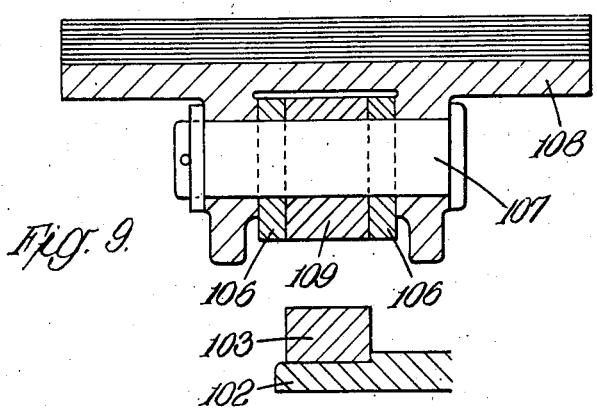
Figure 10:
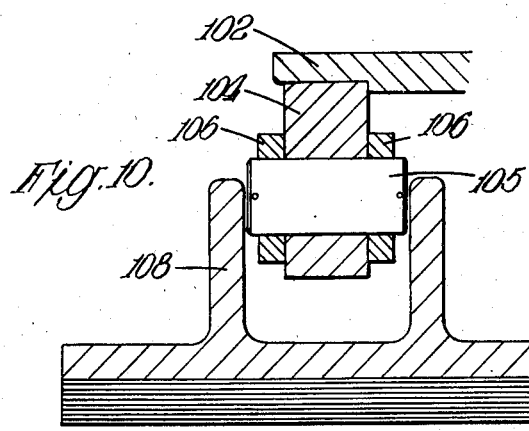

Figures 8, 9, 10 and 11 are sectional views on the lines 8—8, 9—9, 10 and 11—11 in Figure 7, and Figure 12 is a side elevational view of a modified form of brake made in accordance with the invention.

In Figures 1, 2 and 3:

The brake carrier 1 which is fixed to the axle casing has an annular flange 2 on which two axially spaced guiding rings 3 and 4 are rotatably mounted. Each of these two guiding rings has two lugs 5, 6 and 7, 8 which are 180° apart. Corresponding pivot pins 13, 14 and 15, 16 are arranged rotatably in holes in these lugs. Corresponding levers 9, 10 and 11, 12 are connected at one end to these pivot pins. In each of the brake shoes 21, 22 are two holes located adjacent to their ends, in which corresponding pivot pins 17, 18 and 19, 20 have their bearing. The remaining ends of the levers 9, 10, 11, 12, are connected to the last mentioned pivot pins. Slots 25 and 26, are provided in the middle of the brake shoes 21 and 22, respectively, through which pass pins 23 and 24, respectively, that are fixed in the brake carrier 1. Levers 27 and 28, on the pins 23 and 24 have their opposite ends pivoted on the pins 23 and 24 and the bolts 19, and 17, respectively.

On each of the pins 13 and 15 is pivoted a corresponding guiding piece 31, 32, which can slide tangentially in corresponding cam blocks 35, 36.

The sliding movement serves for the adjustment of the brake shoes and is carried out by worms 33, 34 and worm wheels 29, 30. The worm wheels 29, 30 are fixed to bolts 37, 38, having their nuts in the connecting blocks 31, 32. The cam blocks 35, 36 are mounted on the rings 3 and 4 in a manner to permit some circumferential movement but prevent any radial movement of the blocks relative to the rings. By turning the cam 39 out of the position shown in Figure 1 the blocks 35, 36 are moved apart. The distances of the points 98 and 99 from the cam centre are equal in order to equalize the movement of the cam blocks. Return of the two rings and the brake shoes to initial positions is effected by means of the contractile spring 40.

In the construction illustrated in Figure 4, the lugs 41, 42 of the guiding rings 3, 4, have slots 45, 46 in which flat sided pins 43, 44 can slide. These pins are mounted in the brake shoes 21, 22.

Figure 5 shows the same slotted arrangement applied to a fourshoe brake. Each of the rings 3, 4 has four lugs each 47, 48, 49, 50. In the lugs are slots 55, 56, 57, in which the flat sided pins of the brake shoes can slide. The pins 67 are fixed in the brake carrier. The levers 66 are mounted on the pins 67 and on the flat sided pins 52. The cam block 60 has extensions reaching to the middle of the brake shoe. At the ends of these extensions are holes in which the socket 61 is borne. In the socket is a thread for the screw 62. A worm wheel 65 is connected with the screw 62 which is carried by a lug 63 on the rings 3, 4. The adjustment is effected by means of the worm 64. The return movement of the brake shoes to their normal positions is effected by means of springs 68.

In the four-shoe brake shown in Figure 6, the lugs 69, 70, 71, 72 which are part of the guiding rings 3, 4, have holes in which the pins 73, 74, 75, 76, are rotatably mounted. In each of the brake shoes 87, 92 are two holes in which the pins 81, 82, 83, 84 are carried. Corresponding ends of the levers 77, 78, 79, 80 are mounted on the pins 73, 74, 75, 76 and on the pins 81, 82, 83, 84, the bolts being rotatable in the levers. The pin 90 which is fixed in the brake carrier 1 passes through the slot 91 of the brake shoe 92. Corresponding ends of the lever 89 are mounted on the pins 82 and 90.

The rings may be mounted on roller or needle bearings.

In Figure 7, a ring 103 turning on a stationary circular flange 102 fixed on the brake housing 101 has lugs 104 connected by pins 105 and links 106 to the pivot pins 107 carried by the brake shoes 108. The pivot pins 107 are connected by links 109 to the fixed pins 110, the apertures in the links adjacent to the fixed pins being elongated as shown at 111. The links 109 are pulled by springs 112. The arrangement 113, 114 applies power to the ring and the spacing between the part 114 and the lug 104 can be adjusted by the arrangement 115, 116, 117. The shoes are connected to each other by guides 119 sliding in guideways 120.

In the constructional form of the invention shown in Figure 12, a single ring 103a is provided. This ring has two radially extending lugs 104a carrying pivot pins 105a offset 180° from each other and disposed a short distance one on one side and one on the other side of a line connecting the middle points of two brake shoes 108a. The pins 105a are connected by links 106a each to a pivot 107a carried by the brake shoe midway between its ends. These pivot pins are linked by links 109a to pins 110a carried by a fixed part. The apertures in these links engaged by the fixed pins 110a are slightly elongated as at 111a. The two pairs of links form toggles, each pair being opened to about 90° or a little more. A short rotary movement applied to the ring in one direction tends to collapse the toggles and force the shoes outwardly. The trailing end of each shoe is connected at 123a by a link 122a at 119a to a radially outwardly projecting lug 112a on the ring 103a, whereby a parallel action of the shoes is ensured. A spring 124a pulls on a lug 125a for returning the ring to its normal position. Other springs 129a pull on the ends of the toggle links 109a adjacent to the fixed pins 110a so that the elongated apertures 111a are drawn towards the trailing ends of the shoes. When the brake is applied, the braking force will tend to move the shoe in the direction of rotation of the brake drum, thereby increasing the pressure of the shoes through the leverage of the toggle links and of the links at the trailing ends of the shoes. The elongated apertures 111a permit any slight movement of the shoes necessary for this purpose. A powerful servo action is thus exerted on both shoes.

I claim:

1. A brake apparatus comprising a stationary wheel hub, brake shoes mounted concentrically about said hub, at least one rotatably mounted ring means surrounding the wheel hub, combination lead multiplying and motion devices connecting the ring means to the brake shoes whereby rotary movement applied to the ring means imparts outward motion to said shoes to apply the braking force, said devices including a pair of circumferentially spaced cam blocks sliding in corresponding slots for connecting the ring to the shoes, a fixed guide pin for each shoe, and a link connecting said pin to said shoe, the point of connection of the link to the shoe lying outwardly of and in advance of the fixed guide pin to produce a servo effect, and means for confining the shoes to limited radial and circumferential movement when in braking position.

2. A brake apparatus comprising a stationary wheel hub, at least one arcuate brake shoe, a pair of rings rotatably mounted about said hub, circumferentially spaced cam means between said rings and shoe and operable upon reverse rotation of said rings for producing outward motion of the shoe with respect to said hub to thereby move said shoe to braking position, link means connecting said shoe to said hub, the point of connection of the link means to the shoe lying outwardly of the point of connection of the link means to the hub, said link means forming an angle with a radial line passing through said last-named point, and means for cooperating with said link means confining said shoe upon said hub to limited radial and circumferential movement when in braking position, whereby reverse rotation of said rings an equal amount will produce unequal radial movements of the shoe at the respective cam means.

3. A brake apparatus comprising a stationary wheel hub, at least one arcuate brake shoe, a pair of actuator rings rotatably mounted about said hub, cam means between one of said rings and said shoe for outwardly displacing one end of the shoe, second cam means between the other of said rings and said shoe for outwardly displacing the other end of said shoe, means for oppositely rotating said rings whereby outward movement of said shoe will be effected while moving to braking position, and means for producing unequal radial movement of the brake shoe at the first and second cam means respectively when said rings are oppositely rotated equal amounts.

4. In a brake apparatus comprising a stationary wheel hub having at least one arcuate brake shoe, means for producing outward movement of the shoe comprising a pair of relatively connection between one end of said shoe and one of said actuator members, a second pin and cam slot connection between the other end of said shoe and the other of said actuator members whereby relative movement of said actuator members will produce outward movement of the shoe, and means for producing unequal radial movement of the brake shoe at the first and second cam means respectively when said actuator members are moved equal amounts in opposite directions.

5. In a brake apparatus according to claim 4 wherein said last-named means comprises a fixed pin on said hub intermediate said cam slot connections, a second pin on said shoe at a greater radial distance from the center of said hub than said first pin and circumferentially spaced from the first pin, and a link connecting said pins whereby servo effect will be produced upon application of the brakes.

6. In a brake apparatus according to claim 4 wherein said last-named means comprises a fixed pin on said hub, and a link connecting said fixed pin with one of the aforementioned shoes whereby a servo effect is produced upon application of the brakes.

EMIL ZIPPER.

REFERENCES CITED

The following references are of record in the file of this patent:

UNITED STATES PATENTS

| Number | Name | Date |
| --- | --- | --- |
| 1,739,781 | Christensen | Dec. 17, 1929 |
| 2,087,553 | Schiavon | July 20, 1937 |
| 2,184,050 | Miles | Dec. 19, 1939 |
| 2,376,889 | Zipper | May 19, 1945 |